Nov. 3, 1925.

F. X. CURLEY 1,560,020

DEVICE FOR TEACHING THE TOUCH SYSTEM OF TYPEWRITING

Filed Dec. 6, 1924

Inventor.
Francis X. Curley
By attorneys
Southgate, Fay & Hawley

Witness
C. F. Nisson.

Patented Nov. 3, 1925.

1,560,020

UNITED STATES PATENT OFFICE.

FRANCIS X. CURLEY, OF WORCESTER, MASSACHUSETTS.

DEVICE FOR TEACHING THE TOUCH SYSTEM OF TYPEWRITING.

Application filed December 6, 1924. Serial No. 754,413.

*To all whom it may concern:*

Be it known that I, FRANCIS X. CURLEY, a citizen of the United States, residing at Worcester, in the county of Worcester and State of Massachusetts, have invented a new and useful Device for Teaching the Touch System of Typewriting, of which the following is a specification.

This invention relates to an attachment for a keyboard for the purpose of facilitating the teaching of the touch system thereon.

The principal object of the invention is to provide each key with a means in the form of an attachment by which the letter or character on the key is temporarily concealed from the student and several keys, or finally all the keys, look alike so that she is compelled to learn the location and identification of the keys without referring to the characters that are commonly thereon.

Another object is to eliminate the shield ordinarily used. It is desirable in the use of this invention to provide each key with a detachable disc so that the teaching can be done by steps and certain sections of the keyboard can be provided with these discs to conceal the characters and the student can practice on these until familiar with a small number of keys by location instead of visible characters. Then the process of teaching can go on with other keys in the same manner until finally the student can operate the machine with none of the characters visible.

Reference is to be had to the accompanying drawings, in which

Figure 1:
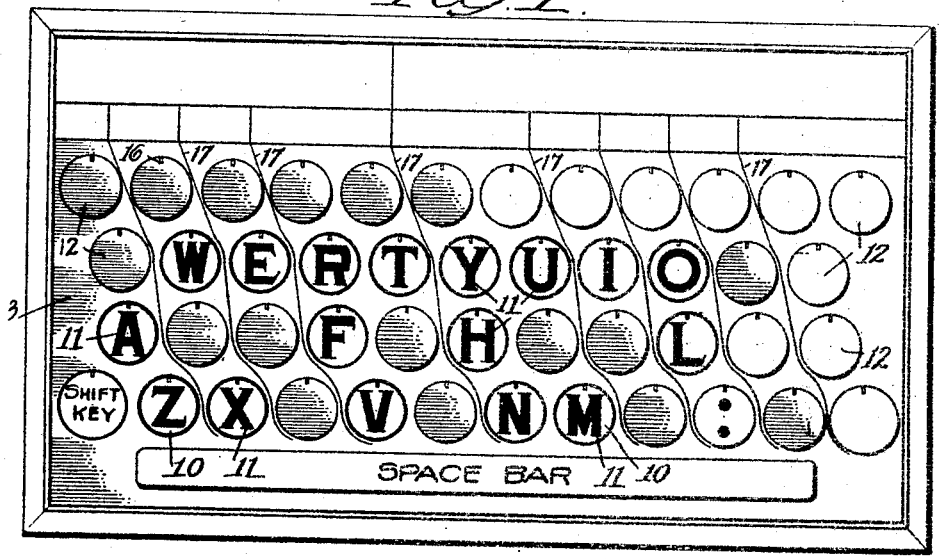
Fig. 1 is a plan of a diagram and keyboard showing some of the keys concealed in accordance with this invention for the purpose of intermediate teaching.

It is well recognized now that the touch system is the best method of typewriting. It has been difficult to teach it heretofore because it was impossible to tell whether a student is looking at the keyboard or not in the class room and it is difficult for some students to avoid it even when the shield is used. Furthermore, there has been no method of introducing the teaching of the touch system gradually, as far as I am aware.

According to this invention I provide each key on the keyboard with a disc 10 having on one side the character 11 which the key has and having the other side 12 entirely blank and painted the same color as the background 13 against which it appears. This disc has a perforation 14 and each key 15 is provided with a pin or hook 16 for receiving this perforation and on which the disc is adapted to be hung either side out.

In Fig. 1 I have shown the bank of keys of the typewriter adapted for use for teaching purposes with these discs on all the keys. On some of them they are right side out so that the letters show and on the others they are turned the other way around so that the keys appear blank and not distinguishable from the background 13 below.

In the process of teaching I divide up the keyboard by a number of lines 17 to provide sections on which the different fingers of the hand are used. It is convenient, as shown at the right, to start the student on the touch system by turning the discs around so that their blank faces show on one or more of the sections thus provided so that the student will have to get the position of the letters or characters on the keyboard for one or two fingers while locating in the usual way the other characters. Then by gradually covering more and more of the letters the student is finally brought up to the condition indicated in Fig. 1, in which all the characters, across the top for example, are concealed and several others at various points around the keyboard. It is generally desirable to practice with some of the letters that are most frequently used concealed so that a great deal of practice on those letters will be obtained in the course of the instruction, and finally, the letters less frequently used will be learned by the student very easily.

Figure 2:
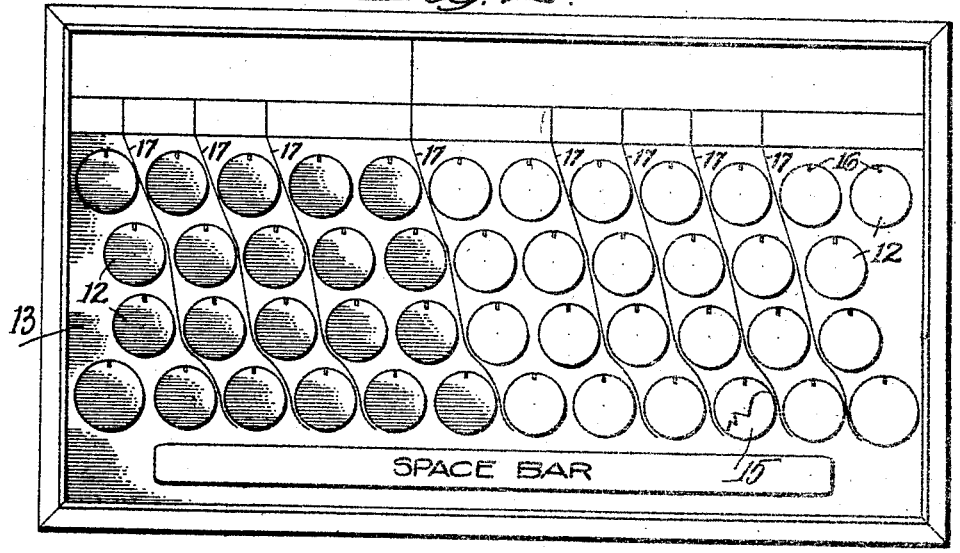
Fig. 2 is a similar view with all characters concealed for the final test of the applicant's ability to write solely by the touch system and for practice.
Figure 3:
Fig. 3 is a perspective view of one of the detachable discs.
Figure 4:
Fig. 4 is a perspective view of it from the other side.

Finally, the student gets so that she can manipulate the whole keyboard without any characters appearing on it at all and it is set up in the manner shown in Fig. 2 for practice so as to insure rapid work. In this way the touch system can be taught very rapidly and the proficiency of the student can be brought up to a high degree in a comparatively short time. The elements of confusion heretofore present are largely eliminated by this means.

Although I have illustrated and described only a single form of the invention I am aware of the fact that modifications can be made therein by any person skilled in the art without departing from the scope of the invention as expressed in the claims. Therefore I do not wish to be limited to all the details of construction herein shown and described but what I do claim is:—

1. In a device for teaching the touch system of typewriting, the combination with a bank of typewriter keys, of a device detachably mounted on each key and adapted to be reversed and having on one side a character like the character represented by the key and having the other side blank, whereby any number of these devices can be turned over on the blank side to conceal the characters and permit of the student's practicing on the particular ones concealed.

2. The combination with a bank of typewriter keys, of a hook at the upper side of each one and a series of discs each having one side blank and indistinguishable from the background below the keys and the other side having a character thereon, each disc having a perforation by which it can be hung on the hook to cover the key.

3. As an article of manufacture, a device for use in teaching the touch system of typewriting consisting of a disc having a character on one side and the other side blank provided with means by which it can be detachably mounted on a typewriter key.

In testimony whereof I have hereunto affixed my signature.

FRANCIS X. CURLEY.